May 5, 1936. H. HARZ 2,039,314
ELECTRICAL SYSTEM
Filed May 3, 1934
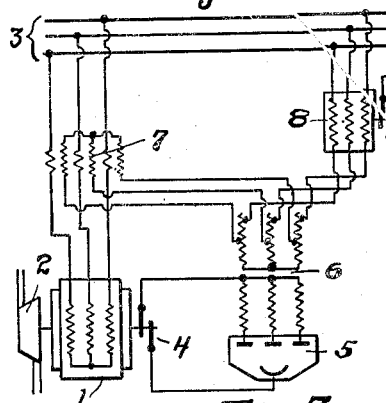
Fig. 1
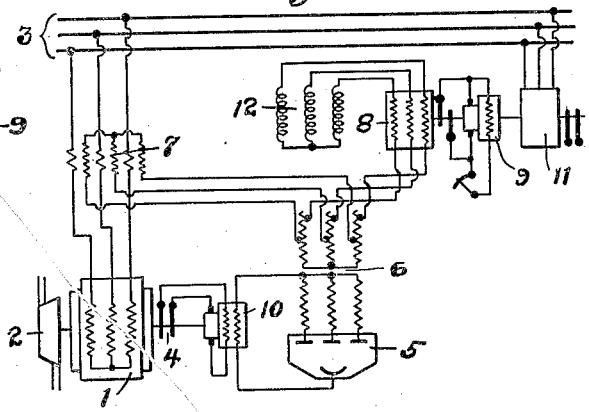
Fig. 2
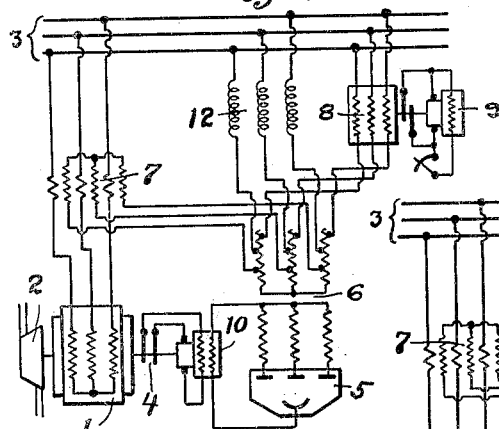
Fig. 3
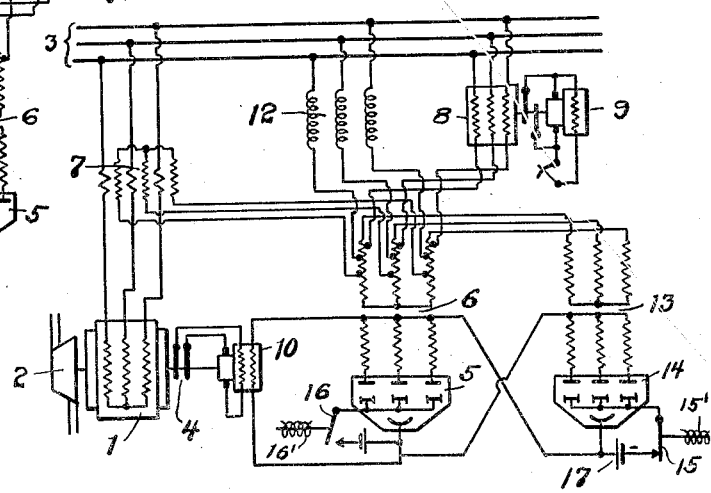
Fig. 4
Fig. 5
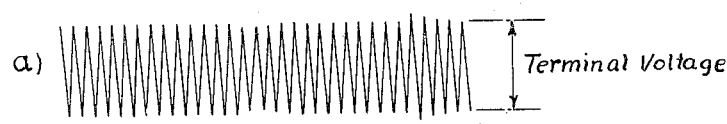
a) Terminal Voltage
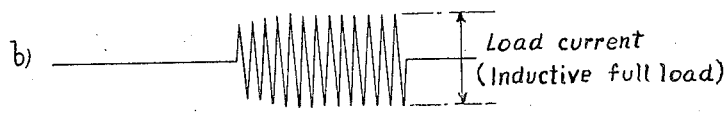
b) Load current (Inductive full load)
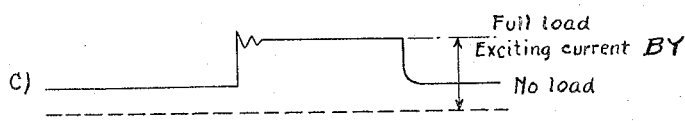
c) Full load Exciting current BY — No load
INVENTOR
Hermann Harz
ATTORNEY Patented May 5, 1936

2,039,314

UNITED STATES PATENT OFFICE 2,039,314

ELECTRICAL SYSTEM

Hermann Harz, Berlin, Germany, assignor to Radio Patents Corporation, New York, N. Y., a corporation of New York Application May 3, 1934, Serial No. 723,657
In Germany May 6, 1933

13 Claims. (Cl. 171—119)

My invention relates to a system for controlling the current flow in a direct current circuit and more particularly to a novel method and circuit arrangement for automatically controlling the exciting current of electric machines, especially of a synchronous generator connected to a distribution network dependent on varying load conditions for maintaining stable operating conditions in the generator and the connected network.

One object of my invention resides in the provision of a circuit arrangement for adjusting the current in a direct current circuit to a predetermined value independent of temporary variations of the impedance of the circuit, such as occasioned by an inductive reactance inherent in the circuit.

Another object of my invention consists in the provision of a circuit arrangement for instantaneously adjusting the current in a direct current circuit to a predetermined value in accordance with a regulating or controlling influence without any appreciable time delay between the occurrence of the controlling influence and the readjustment of the current in the circuit.

A further object of my invention consists in providing a direct current circuit carrying a current of desired intensity comprised of a plurality of separate superimposed currents, and means for adjusting one or several of the component currents substantially without mutual interference with the other components for securing an instantaneous adjustment of the current by a controlling or regulating influence.

A more specific object of my invention resides in the provision of a direct current electrical circuit, and means for establishing a current of predetermined value therein, said current being derived by superimposing the currents from a plurality of alternating current sources by means of a rectifier feeding the direct current circuit whereby either one of the alternating current components or a combination thereof may be subject to variations causing an instantaneous change of the respective component in the direct current circuit without any substantial mutual interference with the remaining current components.

Still a further object of my invention consists in the provision in a direct current circuit, of means for producing a current of predetermined value in said circuit comprising an alternating current supply circuit connected to said direct current circuit by means of a rectifying device, and means for producing large reactive currents in the alternating current supply circuit being of the order of magnitude of a substantial multiple of the current to be transferred to the direct current circuit, resulting in a reduction of the effective time constant in the direct current circuit due to non-reactive resistance induced in said direct current circuit from the alternating current supply circuit.

My invention has special application to the automatic control of synchronous machines, in particular synchronous generators connected to a distribution or transmission network. In order to maintain constant operating conditions both in the generator and the connected network, it has become customary to provide means, such as a voltage regulator, for automatically readjusting the exciting current of the synchronous generator depending on varying load conditions, such as the load current, the terminal voltage, load power factor, etc. of the generator. Regulators of this type, such as the well known contact regulators of the Tirrill type, operate satisfactorily if the load changes are within small limits and take place at a sufficiently low rate.

If it is desired, however, to compensate very rapid and sudden load variations, such as during a sudden short circuit occurring in the network or when suddenly connecting the synchronous machine from no load to full load, regulator devices of the known type are entirely unsuited due to their inherent mechanical inertia and their characteristic function to regulate the voltage rather than the current in the exciting circuit involving furthermore the objectionable effect of the inductive reactance of the exciter winding resulting in a further delay of the adjustment of the exciting current for compensating a varying load condition of the machine. This, as is well known, causes undesired hunting of the generator which may eventually result in a complete falling out of step with the line frequency causing a disruption of the service and serious impairment of the operating stability in the connected network.

This disadvantage is especially felt in the case of extended interconnected distribution networks and transmission lines coming into use more and more wherein the synchronous machines located at different points of the network act as supports or boosters of the voltage at such points in such a manner that an interruption or falling out of step with the line frequency of one machine will be seriously reflected upon the network and upset its operating stability.

The invention has further specific utility in connection with what has become known as "super-excitation" of synchronous machines, such as synchronous generators connected in extended networks. Whenever a disturbance is set up in the line, such as by a short circuit caused by a lightning stroke, sudden switching operations, etc., the excitation of the synchronous machine is increased considerably beyond its normal value so as to force the supply of reactive currents into the network acting as a protection against sensitive apparatus fed from the network and enabling the disconnection of endangered devices by the proper and safe operation of protective devices provided for this purpose as well known in the art.

Accordingly, it is a further object of my invention to provide an arrangement for controlling the excitation of synchronous machines dependent on varying load conditions instantaneously and without any appreciable time lag between the occurrence of a sudden load variation and the readjustment of the exciting current.

A further object of my invention is to provide a regulating or compounding system for synchronous machines, such as synchronous generators, connected to an electrical network which is free from the effect of mechanical and electrical inertia resulting in the maintenance of constant operating conditions and stable operation independent of load variations within wide limits from no load to full load current and without any objectionable effects as hunting, etc. usually experienced in systems of this type.

Another object of my invention consists in the provision of a regulating or compounding circuit arrangement for synchronous machines connected to an electric network acting purely electrically and without the use of any mechanical parts.

Still a further object of my invention resides in the provision of a new regulating or compounding system for synchronous machines, such as synchronous generators, for directly and instantaneously readjusting the exciting current of the generator rather than the exciting voltage as in the case of arrangements heretofore known in the art resulting in a ready and instantaneous compensation of sudden variations of load within wide limits from no load to full load current condition.

Another object of my invention resides in a novel circuit arrangement for compounding or compensating sudden and large load variations of a synchronous generator by using ordinary apparatus, such as transformers, rectifiers, reactive current devices, as synchronous condensers, choke coils, condensers, without the requirement of any special devices of new design and construction.

A more specific object of my invention consists in the provision of a circuit arrangement for supplying the exciting current for a synchronous machine, such as a synchronous generator in current transformer fashion, and as the sum of a plurality of alternating currents through an interposed rectifier supplied from alternating current circuits carrying heavy reactive power of an order of magnitude substantially higher than the power required in the exciting circuit, whereby one of said alternating currents is derived from a varying load condition of the generator, such as load current, terminal voltage, load power factor, etc. in such a manner that the exciting current in the exciter circuit is directly and instantaneously readjusted to its proper compensating value in accordance with a sudden and large load variation of the generator covering the range between full load and no load condition substantially without any appreciable time delay between the load change and readjustment of the exciting current, thus preventing hunting and other objectionable interference connected with the regulation of synchronous generators in circuit arrangements as heretofore known in the art.

These and further objects and aspects of my invention will become more apparent from the following detailed description taken with reference to the accompanying drawing in which I have illustrated by way of example a few circuit arrangements embodying the invention. It is understood further that the embodiments of the invention as shown and described are to be regarded as being illustrative only of the broader and underlying principle of the invention which as will become obvious is subject to various modifications and variations as expressed by the appended claims.

Figure 1 illustrates a simple circuit arrangement in accordance with my invention comprising a synchronous machine connected to an electrical network.

Figure 2 shows a modification of Figure 1 including a special exciting generator for the synchronous machine.

Figure 3 shows a further modification of the circuit according to Figures 1 and 2.

Figure 4 illustrates an improved circuit arrangement over the previous figures suitable for demagnetizing the synchronous machine when disconnected from the network due to short circuit or other disturbance.

Figure 5 represents curves as obtained from oscillograph records showing the novel operation of the arrangement according to my invention.

Similar reference numerals identify similar parts throughout the different views of the drawing.

As is well known, the load current of a synchronous machine reacts upon the exciting field, this phenomena being known as armature reaction. If it is desired to maintain the exciting field in the machine and in turn the terminal voltage at a constant value, it is necessary to compensate the armature reaction by a corresponding variation of the exciting current, or in other words it is necessary to maintain the effective number of exciting ampere turns per unit area, that is, the geometric difference between the number of ampere turns per unit area of the rotor winding and stator windings at a practically constant value. For this purpose usually high speed regulators are provided. The smaller the effective number of exciting ampere turns as compared with the number of ampere turns per unit area of the stator or rotor, respectively, that is, the smaller the air gap between the rotor and the stator, the more the function of the regulator will be required.

Despite the use of high speed regulators, the compensation of the armature action in most cases does not take place fast enough as the control of the rotor ampere turns takes place through mechanical elements which in turn have to control the exciting circuits of one or more exciting generators, unavoidably causing a temporary voltage reduction. Especially if the machines operate on long transmission lines, the transmission may completely break down if one of the machines which acts for supporting or boosting the voltage at the respective point in the network falls out of step with the line frequency.

It has already been proposed to compensate the armature reaction automatically by the provision of a rotary converter having its slip rings supplied from a current transformer connected in series with the synchronous generator, while the commutator of the converter supplies the direct current for the exciter winding. The operation of such rotary converter directly coupled with the synchronous machine (Rice-Danielson-converter) is largely dependent on the phase position of the primary current, that is, the load of the synchronous generator. With a definite power factor, for instance, cos $\varphi=1$, the alternating current applied to the slip rings of the rotary converter is merely rectified into direct current and supplied from the commutator in its full value. On the other hand, with a power factor cos $\varphi=0$, the alternating current applied to the slip rings merely acts on the exciting field of the converter. In the latter case the commutator current is dependent, on the one hand, on the voltage produced by rotation through the field and, on the other hand, on the impedance of the direct current or exciting circuit, while in the former case the current is substantially independent of the impedance of the exciting circuit. Thus the rotary converter operates like a current transformer and simultaneous frequency converter whereby the voltage automatically adjusts itself to the existing impedance in the circuit. If the exciting field in the stator is not sufficient, part of the slip ring current will be used to contribute to the formation of the field. In the latter case, however, the entire slip ring current merely acts on the field either in a direct or opposite sense with the exciter field and the current supplied by the commutator is produced by pure generator action by the rotation of the armature through the field.

If the rotary converter is allowed to run freely, it will operate as a current-frequency converter, but its behavior will depend on the slip ring voltage varying within wide limits so that no satisfactory operation is possible in this case. If the rotary converter is coupled with a separate synchronous machine to maintain its synchronism, the same difficulties are experienced as in the case of direct coupling with the main generator.

Besides the aforementioned drawbacks when using a rotary converter in connection with a compounding system for synchronous machines, it is not possible to supply to the synchronous generator an exciting current independent of the load as both exciting currents (normal exciting current under normal condition and controlling current variation during load changes) will interfere with each other when a current change takes place in the arrangements as known in the prior art.

By using an arrangement according to my invention, it is possible to control the exciting current of a synchronous machine by separate regulating influences without any mutal interference and by direct adjustment of the exciting current by purely electrical means and without the use of mechanical regulating organs. In this manner the exciting current may be controlled depending either on load current variations of the synchronous machine, terminal voltage, line current, load power factor, or any other magnitude or combination thereof.

In accordance with my invention I provide a rectifier, preferably of the discharge type, such as a mercury rectifier, supplying the exciter winding of the synchronous machine either directly or through one or several exciter generators. The input of the rectifier is supplied by means of a current transformer arrangement with alternating currents corresponding to the desired regulating influences, such as load current, load power factor, terminal voltage, etc. All these currents are geometrically added in the input transformer associated with the rectifier and then applied to the exciting winding of the synchronous machine or a special exciter generator.

The use of a current transformer arrangement in accordance with my invention has the special advantage that such an arrangement regulates on the current rather than on the voltage as in the case of heretofore known devices of this nature (such as the known regulator systems using the contact type regulator which opens and short circuits a resistance in the exciter circuit requiring a certain time for the current to adjust itself to the new required value) and tends to adjust and maintain the current in the connected consuming circuit (exciter winding) under all circumstances and independently of the impedance of the circuit. If variations in the impedance value occur, they are automatically compensated by an increase of the voltage.

The exciting winding of a synchronous machine represents a direct current circuit provided with inherent inductive reactance, but having only ohmic resistance in the stationary condition. With an increase of the current, however, the inductivity increases the impedance considerably in such a manner that a corresponding higher voltage is required to bring the current up to its new value. Such increased voltage is readily and instantaneously supplied due to the large energy content inherent in the current transformer arrangements. As soon as the current has reached its new value, the voltage will decrease immeditely to its lower stationary value while the current will retain its new value.

Referring more particularly to Figure 1 of the drawing, I have shown a three-phase synchronous generator 1 driven by a prime mover indicated at 2 and connected to a three-phase network shown at 3. The exciting current for the field winding of the generator is supplied in the usual manner across slip rings as shown at 4 and by means of a rectifier 5, preferably a discharge rectifier of the mercury type as shown in accordance with the invention. The input is supplied to the rectifier through an input transformer 6 having its primary winding supplied in the example illustrated with two superimposed currents in current transformer arrangement, one of said currents being supplied by the compound current transformer 7 connected in series with the synchronous generator 1 and the other current being supplied by a source of reactive current as shown at 8. The latter may consist of a synchronous machine, such as a synchronous condenser, as shown, provided with exciter 9 in the usual manner, but any other device supplying sufficient reactive current to the primary of the rectifier transformer 6, such as a choke coil, or condenser arrangement, may be provided in place of the synchronous condenser as shown in the drawing.

The power supplied by the synchronous machine 8 or other source of reactive current should be a multiple of the power to be supplied to the transformer 6, while furthermore the power supplied by the synchronous generator 1 is a multiple as compared to the power transferred through the compound transformer 7 to the input of the transformer 6 of the rectifier 5.

In this manner both currents are readily superimposed in the primary of the transformer 6 without mutual interference producing a corresponding superimposed secondary current in the secondary winding equal to the sum of the currents. Voltage variations caused by changes of one of the currents have no influence on the value of the other current since the voltage at the transformer 6 is small as compared to the voltage of the reactive impedances 1 and 8 connected in series therewith. Thus, if the current supplied by the compound transformer 7 causes a voltage variation at the transformer 6, this has practically no influence on the value of the current through the transformer since the voltage drop at 8 is practically constant, it having been assumed that it is large as compared to the voltage at transformer 6. The current thus supplied by the transformer 7 causes automatically an increase of the excitation of the generator 1 when the generator is loaded, thus counteracting the armature action.

The synchronous machine 8 or other source of reactive current inherently tends to supply a constant portion of the exciting current for the exciter circuit of the generator 1 (as long as the voltage in the network remains constant). If the line voltage in the network decreases, the current supplied by the synchronous machine 8 automatically increases, thus strengthening the excitation of the main generator 1.

It is also possible to provide the primary winding of the transformer 6 with tap connections as shown, thus varying the effective number of ampere turns of both currents whereby the effect produced by both currents may be adjusted at will as desired. Instead of using a common primary winding, it is understood that a separate transformer may be provided for each current in which case the secondary windings of the transformer would be connected in parallel.

Variations of the phase position of the stator current of the main generator do not have the drawbacks as in the case of a direct coupled rotary converter since the currents are rectified by the rectifier independently of phase condition. The rectifier thus operates in a similar manner to a freely running rotary converter, but without the disadvantage of being dependent on the slip ring voltage.

The current supplied by the synchronous condenser 8 or other source of reactive current may serve for maintaining the field of the generator 1 both at no load and at full load by properly designing the transformer 7 so as to compensate for the armature reaction only. It is furthermore advisable to provide a regulator of known construction, such as a contact regulator, for controlling the excitation of the synchronous condenser 8 depending on variations of the line voltage in such a manner as to control the current supplied by the synchronous condenser 8 to maintain constant the voltage of the main generator 1. In this case the regulator has merely to correct small variations of the rotor ampere turns of the generator 1 as the armature reaction is already being compensated by means of the transformer 7. By further considering that the current variations of the synchronous condenser 8 is dependent on the line pressure, it is seen that in this manner the regulator is largely relieved.

Referring to Figure 2 of the drawing, I have shown a modification of the arrangement as described by Figure 1 differing therefrom by the provision of a special exciter generator 10 between the rectifier 5 and the main generator 1. The exciter 10 is preferably equipped with a compensation winding practically eliminating the effect of the inductivity of its armature circuit. The effect of the inductivity of its exciter winding is eliminated largely due to the function of the current transformer connection used, in such a manner, that the current in the exciter winding and in turn the exciter field instantaneously rises and falls to the required value. This in turn causes a corresponding change of the armature voltage of the exciter 10 instantaneously and to the full value required and in proportion to the applied exciting current. The current in the rotor winding of the main generator 1 is then merely dependent on the time constant of the circuit. However, by increasing the exciting current or the armature voltage, respectively, of the exciter 10 to a multiple value of its normal magnitude corresponding to the stationary condition by properly designing the exciter generator and its exciting circuits, the instantaneous change of the exciting current for the generator 1 to the required new value is practically insured in a manner similar as in the case of Figure 1. I have found it further advisable in order to insure an instantaneous and rapid change of the exciting current and the exciting field of the exciter 10 to construct both the magnetic circuit of its stator and rotor with insulated metal sheets.

In an arrangement according to Figure 2, the generator 10 merely acts as an amplifying means for the energy supplied by the rectifier 6 whereby the dimensions of the circuit elements of the current transformer arrangement may be kept considerably smaller than in the case of direct connection to the exciter winding as shown by Figure 1.

Figure 2 is further modified as compared to Figure 1 by showing the synchronous condenser 8 disconnected from the line 3 and driven by a separate synchronous motor 11, and feeding a separate choke coil 12 constituting an inductive load. The reactive power supplied to the choke coil 12 should again be a multiple of the power transferred to the rectifier 5 through the transformer 6 as is well understood in a manner similar as described in connection with Figure 1. When using a circuit arrangement according to Figure 2, the current through the synchronous condenser 8 is independent of the line pressure. This may be of advantage if the line 3 is without pressure and it is desired to start and connect the generator 1 to the line.

Referring to Figure 3, this illustrates a similar arrangement according to the invention, differing essentially from Figure 2 in that the choke coil 12 and the synchronous condenser 6 are connected in parallel to the line 3 and that the current through the choke coil 12 flows across the transformer 6. As the choke coil current is lagging while the current through transformer 6 is leading with respect to the line voltage, both currents will counteract each other in the transformer 6 and only a current corresponding to their difference will be rectified by the rectifier 6 and applied to the exciter winding of the main generator 1. From this it follows that it will be necessary to increase the dimension of both the synchronous condenser 8 and the choke coil 12 correspondingly as compared with the arrangement according to Figure 2.

The circuit of Figure 3 has the advantage that with increasing line voltage, the current through choke coil 12 decreases, thereby decreasing its counteraction in the transformer 6 against the current supplied by 8 whereby the rectified current increases. By designing 8 and 12 sufficiently large as compared to the power supply to 5 and 6, it is seen that this circuit acts to maintain the line voltage at a constant value. It is furthermore seen that the compound transformer 7 may be omitted in an arrangement of this type in which case the differential action of the currents of the synchronous condenser 8 and the choke coil 12 will also compensate the armature action.

Arrangements as hereinbefore described may furthermore be used in accordance with a further feature of my invention for demagnetizing the generator 1 in case the reactive power supplied by the generator to the line in case the line voltage has broken down is not sufficient to maintain the operating voltage at its proper predetermined value. For this purpose the current supplied by the current transformer circuit is applied to act in the opposite direction in the exciter winding of the synchronous machine 1 until the residual magnetic field disappears whereupon the exciter winding may be disconnected or short circuited. In order to avoid mechanical switching operations, I propose to provide a second rectifier connected to the first rectifier in reverse fashion. Both rectifiers are provided with controlling elements, such as control grids, well known in the art of vapor discharge devices, such as in thyratrons, and the like. The second rectifier is normally blocked by applying a negative potential to its controlling grid. If it is desired to demagnetize the generator, the second rectifier is released and the first rectifier blocked, thus reversing the rotor ampere turns of the synchronous machine. When the counter current has reached a definite magnitude, the field of the synchronous machine disappears and the first rectifier may then be released by means of a relay operated by the current through the exciter winding whereby each rectifier is short circuited across the other rectifier. This is quite possible as the value of the current is predetermined by the current transformer arrangement.

Referring to Figure 4, I have shown a circuit arrangement of this type which otherwise essentially corresponds to Figure 3. According to Figure 4 I provide a further rectifier 14 similar to the rectifier 5 and associated input transformer 13. The rectifier 14 is connected to the rectifier 5 in reverse fashion as shown, that is, the cathode of the rectifier 5 is connected to the anodes of the rectifier 14 and vice versa. The primaries of both rectifier transformers 6 and 13 are connected in parallel. As long as the grid of the rectifier 14 is blocked, such as by the application of a negative potential by means of a source shown at 17, the current can pass only through the transformer 6 and associated rectifier 5. The transformer 11 merely carries a small magnetizing current. By releasing the rectifier 14, such as by disconnecting the grid biasing potential by opening switch 15 in the biasing circuit by means of a relay indicated at 15', and by simultaneously blocking the rectifier 5 by closing switch 15 operated by relay 16' and applying a negative grid potential, the direction of the secondary current is reversed. The transformer 5 will operate at no load in parallel to the transformer 13. When the current through the rotor of the generator 1 has reached a value sufficient for neutralizing the residual magnetic field, the rectifier 5 may again be released either by hand, or automatically by means of the relay or trip coil 16' operated by the exciting current. In this manner the current in the exciter winding 10 and in turn the rotor of the synchronous machine becomes zero.

The advantage of arrangements as described before in accordance with my invention resides primarily in the fact that the excitation of the synchronous machine is automatically adapted to the load and adjusted to maintain the voltage or other load condition constant without the use of any regulating or special devices. If regulators are used as described, they have to correct merely small variations and operate under the most favorable conditions. The objectionable effect of the inductivity of the exciting circuits on the change of the exciting current is largely eliminated in that the time constant of the circuits $L/r$ is substantially decreased (by the provision of large reactive impedances in the net frequency or supply circuits feeding the rectifier connected to the exciter circuit) rather than by the connection of ohmic resistances as in the case in regulating systems heretofore known involving unnecessary losses in the exciter circuits and bulky regulating organs. Even if pure reactive impedances, such as choke coils, are used in the primary or supply circuits, their action on the direct current or exciting circuit is equivalent to an induced ohmic resistance due to the constant network frequency, but without the disadvantage of an ohmic resistance directly connected in the exciter circuit. In other words, the reactive impedance in the primary circuit acts to induce an equivalent non-reactive or ohmic resistance in the direct current or exciting circuit, resulting in a substantial decrease of the time constant and in turn elimination of the effect of the inductivity on the rise and fall of the current.

Referring to Figure 5, I have shown curves representing the voltage, the load current and the exciting current of a synchronous generator connected in a system according to the invention. Curve $a$ represents the terminal voltage of the generator, curve $b$ the load current supplied by the generator, and curve $c$ the current flowing through the exciter or rotor winding of the generator. It is readily seeen that with the change of the load current from no load to full load (inductive load causing weakening of the magnetic field), only very slight variations of the terminal voltage occur substantially without any hunting effect as in the case of arrangements known in the prior art. Also, the exciting current as seen from curve $c$ is instantaneously and automatically adjusted to its full value without any substantial variations, and vice versa when the load current is suddenly interrupted as seen from the diagrams. These diagrams were obtained from tests made and oscillographic records taken, proving without doubt the meritorious and novel effects of the invention.

I claim:
1. In combination with an electrical system, a direct current circuit; means for adjusting the current in said circuit to a predetermined value comprising an alternating current supply circuit; a discharge rectifier interposed between said supply circuit and said direct current circuit; means for causing a large reactive current to flow in said supply circuit of a power of the order of magnitude being high relative to the desired average power in said direct current circuit; and means for varying said supply current for adjusting a current of predetermined value in said direct current circuit in accordance with a controlling influence.

2. In combination with an electrical system, a direct current circuit; means for supplying and adjusting the current in said circuit instantaneously and without any appreciable time lag in accordance with a controlling influence comprising a plurality of sources of alternating supply currents; a supply circuit; means for superimposing said alternating currents therein, at least one of said sources supplying a large reactive current of a power of the order of magnitude being high relative to the desired power in said direct current circuit; a rectifier interposed between said supply circuit and said direct current circuit; and means for controlling another of said alternating currents for adjusting the current in said direct current circuit to a predetermined value.

3. In combination with an electrical system comprising a direct current circuit; means for supplying and adjusting the current in said circuit instantaneously and without any appreciable time lag in accordance with a controlling influence comprising a supply circuit; a transformer having its primary connected in said supply circuit; a plurality of alternating current sources connected in series with said supply circuit, at least one of said sources supplying a large reactive current of a power of the order of magnitude being high relative to the desired average power in said direct current circuit; a discharge rectifier interposed between the secondary of said transformer and said direct current circuit; and means for controlling the current of another of said alternating current sources for adjusting the current in said direct current circuit to a predetermined value.

4. In combination with an electrical system, a direct current circuit carrying currents to be controlled; an alternating current controlling circuit; means for applying and controlling the current in said direct current circuit instantaneously and without time lag in accordance with current variations in said controlling circuit comprising a transformer; means for applying controlling currents to the primary of said transformer; further means for superimposing large reactive currents upon said controlling currents of a power of the order of magnitude being high relative to the desired average power in said direct current circuit; and a discharge rectifier interposed between the secondary of said transformer and said direct current circuit.

5. An electrical system comprising a synchronous machine having an exciting circuit and an armature circuit connected to a line; means for automatically maintaining constant a varying characteristic of said machine dependent on varying load conditions comprising a rectifier feeding said exciting circuit; means for supplying the input of said rectifier with reactive current at line frequency and of a power of the order of magnitude substantially high relative to the required average exciting power; and further means for deriving a varying current in accordance with a varying load condition of said machine to be superimposed upon said reactive currents and applied to said exciting winding across said rectifier.

6. An electrical system comprising a synchronous machine having an exciting circuit and an armature circuit connected to a line; means for keeping constant the terminal voltage of said machine dependent on varying load conditions of said machine comprising a discharge rectifier; an input transformer for said rectifier; circuit connections from the output of said rectifier to said exciting circuit; means for setting up large reactive currents through the primary of said transformer of a power of the order of magnitude substantially high relative to the power required in said exciting circuit; and further means for deriving a varying current in accordance with load current variations of said machine to be superimposed upon said reactive currents in said transformer primary.

7. An electrical system comprising a synchronous machine having an exciting circuit and an armature circuit connected to a line; means for maintaining constant the terminal voltage of said machine comprising a discharge rectifier having its output connected to said exciting circuit; an input transformer for said rectifier; a source of reactive current connected in series with the primary of said transformer to produce reactive power therein of the order of magnitude being substantially high relative to the power in said exciting circuit; and a current transformer having its primary connected in series with said line and having its secondary connected in series with the primary of said first transformer to supply a varying current in accordance with varying load of said machine superimposed upon said reactive currents.

8. An electrical system comprising a synchronous machine having an exciting circuit and an armature circuit connected to a line; means for maintaining constant the terminal voltage of said machine dependent on varying load conditions comprising a discharge rectifier having its output connected to said exciting circuit; an input transformer for said rectifier; a synchronous condenser connected to said line and in series with the primary of said transformer, said synchronous condenser being designed to supply reactive power to said transformer of the order of magnitude large relative to the required exciting power; and a current transformer having its primary connected in series with said line and having its secondary connected in series with the primary of said first transformer.

9. An electrical system comprising a synchronous machine having an exciting circuit and an armature circuit connected to a line; means for maintaining constant the terminal voltage of said machine dependent on varying load conditions comprising a discharge rectifier feeding said exciting circuit; an input transformer for said rectifier; an auxiliary synchronous machine; a synchronous motor connected to said line to act as a prime mover therefor; a reactive load device for said auxiliary machine, said reactive load device and the primary of said transformer being connected in series for causing large reactive currents to flow through said transformer of a power of the order of magnitude comparatively high relative to the required exciting power; and a current transformer having its primary connected in series with the armature circuit of said synchronous machine and having its secondary connected in series with the primary of said first transformer to supply a controlling current superimposed upon the reactive current supplied by said auxiliary synchronous machine.

10. An electrical system comprising a synchronous machine having an exciting circuit and an armature circuit; a line to which said armature circuit is connected; means for automatically maintaining constant the terminal voltage of said machine dependent on varying load conditions comprising a discharge device supplying exciting current to said exciting circuit; an input transformer for said discharge device; a synchronous condenser connected to said line and to the primary of said transformer; a reactive load device for said synchronous condenser also connected to said line and the primary of said transformer whereby the current supplied by said synchronous condenser and the current through said reactive device counteract each other.

11. An electrical system comprising a synchronous machine having an exciting circuit and an armature circuit; a line to which said armature circuit is connected; means for maintaining constant the terminal voltage of said machine dependent on varying load conditions comprising a discharge device supplying current to said exciting circuit; an input transformer for said discharge device; a synchronous condenser connected to said line and to the primary of said transmormer in series; a reactive load device for said synchronous condenser also connected to said line and to the primary of said transformer whereby the current from said synchronous condenser and the load current through said reactive device flow in opposite sense through the primary winding of said transformer; and a current transformer having its primary connected in series with said armature circuit and having its secondary connected in series with the primary of said input transformer.

12. In combination, a direct current circuit, means for causing and controlling current flow therein comprising an alternating current supply circuit, a rectifier connecting said supply circuit with said direct current circuit; means for causing a large reactive current to flow in said supply circuit of the order of magnitude which is high relative to the desired average power in said direct current circuit; and means for varying said supply current for adjusting a current of predetermined value in said direct current circuit.

13. In combination, a direct current circuit; means for causing and controlling current flow therein comprising an alternating current supply circuit, a transformer having its primary connected in said alternating current circuit and a rectifier connecting the secondary of said transformer with said direct current circuit; reactive impedance means in said supply circuit for causing a substantially constant reactive current flow therein of the order of magnitude which is high relative to the desired average power in said direct current circuit; and means for effecting impedance variations in said supply circuit of low value relative to the all-over impedance of said supply circuit for adjusting the current flow in said direct current circuit.

HERMANN HARZ.